US010828620B2

(12) United States Patent
Holbrook et al.

(10) Patent No.: US 10,828,620 B2
(45) Date of Patent: Nov. 10, 2020

(54) GASEOUS STORAGE SYSTEM, METHODS FOR MAKING AND USING THE SAME

(71) Applicant: Ingevity South Carolina, LLC, North Charleston, SC (US)

(72) Inventors: Billy-Paul M. Holbrook, Mount Pleasant, SC (US); Robert W. Mims, Dorchester, SC (US); Jeffrey J. Homan, Ladson, SC (US); Cameron I. Thomson, Charleston, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 43 days.

(21) Appl. No.: 15/205,543

(22) Filed: Jul. 8, 2016

(65) Prior Publication Data

US 2017/0007982 A1    Jan. 12, 2017

Related U.S. Application Data

(60) Provisional application No. 62/190,509, filed on Jul. 9, 2015.

(51) Int. Cl.
*B01J 20/28* (2006.01)
*B01J 20/20* (2006.01)
(Continued)

(52) U.S. Cl.
CPC ......... *B01J 20/28042* (2013.01); *B01J 20/20* (2013.01); *B01J 20/2803* (2013.01); *B01J 20/2805* (2013.01); *B01J 20/3007* (2013.01); *F17C 1/00* (2013.01); *F17C 11/00* (2013.01); *F17C 11/005* (2013.01); *F17C 11/007* (2013.01); *F17C 2221/012* (2013.01); *F17C 2221/013* (2013.01); *F17C 2221/014* (2013.01); *F17C 2221/015* (2013.01); (Continued)

(58) Field of Classification Search
CPC . F17C 11/007; F17C 11/005; B01J 20/28042; B01J 20/20; B01J 20/3078
See application file for complete search history.

(56) References Cited

U.S. PATENT DOCUMENTS 3,615,311 A    10/1971    Ignatius
4,000,236 A    12/1976    Redfarn et al.
(Continued)

FOREIGN PATENT DOCUMENTS

EP    0951322      10/1999
RU    2295379 C1    3/2007
(Continued)

OTHER PUBLICATIONS

International Search Report and Written Opinion for PCT/US2016/041482, dated Oct. 4, 2016.
(Continued)

*Primary Examiner* — Hai Vo
(74) *Attorney, Agent, or Firm* — Bryan D. Zerhusen, Esq.; Nicholas R. Herrel, Esq.; Cantor Colburn LLP

(57) ABSTRACT

The present description relates to an adsorbent monolith, method to make the adsorbent monolith, and a gaseous storage system that includes an adsorbent monolith according to the present disclosure. In particular, the adsorbent monolith includes adsorbent, a binder, and a scaffold material.

10 Claims, 6 Drawing Sheets

(51) Int. Cl.
  *B01J 20/30* (2006.01)
  *F17C 11/00* (2006.01)
  *F17C 1/00* (2006.01)
(52) U.S. Cl.
  CPC .. *F17C 2221/032* (2013.01); *F17C 2221/033* (2013.01); *F17C 2221/035* (2013.01); *F17C 2221/037* (2013.01); *F17C 2223/035* (2013.01); *Y02C 10/08* (2013.01); *Y02E 60/321* (2013.01)

(56) References Cited

U.S. PATENT DOCUMENTS

| | | | |
|---|---|---|---|
| 4,296,169 A | 10/1981 | Shannon | |
| 4,364,883 A | 12/1982 | Shannon | |
| 4,399,052 A | 8/1983 | Sugino | |
| 4,717,595 A | 1/1988 | Watanabe et al. | |
| 5,100,474 A | 3/1992 | Hawkins | |
| 5,306,675 A | 4/1994 | Wu et al. | |
| 5,658,372 A * | 8/1997 | Gadkaree | B01D 53/02 95/116 |
| 5,744,421 A | 4/1998 | Robinsong et al. | |
| 5,846,639 A * | 12/1998 | Robinson | B01J 20/20 428/304.4 |
| 6,006,797 A | 12/1999 | Bulow et al. | |
| 6,207,264 B1 | 3/2001 | Robinson et al. | |
| 7,370,657 B2 | 5/2008 | Zhuang et al. | |
| 7,695,796 B2 | 4/2010 | DHikawa et al. | |
| 8,372,184 B2 | 2/2013 | Zimmerman | |
| 2004/0118287 A1 * | 6/2004 | Jaffe | B01D 53/0423 96/121 |
| 2007/0261557 A1 | 11/2007 | Gadkaree et al. | |
| 2008/0207442 A1 * | 8/2008 | Pfeifer | B01J 20/20 502/416 |
| 2010/0173772 A1 * | 7/2010 | Robinson | B01J 20/20 502/402 |
| 2011/0010826 A1 | 1/2011 | Kaskel | |
| 2011/0167530 A1 * | 7/2011 | Wojtowicz | B01J 20/20 2/2.5 |
| 2013/0190542 A1 * | 7/2013 | Romanos | B01J 20/20 585/2 |
| 2013/0276634 A1 * | 10/2013 | McKenna | B01D 53/047 96/153 |
| 2014/0117054 A1 | 5/2014 | Ryan | |
| 2015/0239743 A1 | 8/2015 | Despen | |
| 2015/0283534 A1 | 10/2015 | Constantino | |
| 2017/0007892 A1 | 1/2017 | Holbrook | |
| 2018/0001296 A1 | 1/2018 | Holbrook | |

FOREIGN PATENT DOCUMENTS

| | | |
|---|---|---|
| WO | WO 2013/075768 | 5/2013 |
| WO | WO 2015/054332 | 4/2015 |

OTHER PUBLICATIONS

Extended European Search Report for EP16822030.9, dated Dec. 20, 2018.
Burchell, Thomas D., "Adsorbent Storage for Natural Gas Vehicles", Carbon Materials for Advanced Technologies, Jul. 22, 1999, pp. 286-286.
Crow, "Glass Transisition Temperatures", Jan. 1, 2015, retrieved from the internet: URL:http//polymerdatabase.compolymere%20physics/polymere%20tg.html on Dec. 3, 2018.
U.S. Appl. No. 15/885,300, filed Jan. 31, 2018, US 2017-0007982-A1.
Russian Office Action, dated Dec. 23, 2019, for Application Serial No. RU 2018111367 (with Translation).
Russian Search Report issued by Federal Service on Intellectual Property, dated Nov. 14, 2019, for Application Serial No. RU 2018111367 (with Translation).
Lozano-Castello, D., et al., "Activated Carbon Monoliths for methane storage: Influence on Binder", Carbon, 40, p. 2817-2825 (Jun. 2002).
Kunowsky, M., et al., "Activated Carbon Fiber Monoliths for Hydrogen Storage", Advances in Sci. and Tech., vol. 93, p. 102-111, (Oct. 2014) https://doi.org/10.4028/www.scientific.net/AST.93.102.

* cited by examiner

GASEOUS STORAGE SYSTEM, METHODS FOR MAKING AND USING THE SAME

RELATED APPLICATIONS

This application claims the benefit of U.S. Provisional Application No. 62/190,509, filed 9 Jul. 2015. The entire contents of the aforementioned application are hereby incorporated herein by reference.

BACKGROUND

1. Field of the Art

The present disclosure relates to adsorbent articles and, more particularly, embodiments of the present disclosure relate to adsorbent monoliths comprising a binder and a scaffold material.

2. Description of Related Art

Activated carbon is a well know adsorbent that is available in granular and powder forms. When storing certain gases, for example natural gas, ammonia and hydrogen, a high-density activated carbon block provides the most efficient carbon adsorption. That is, on a volume basis, when storing natural gas, a block with the void volume between particles is greatly reduced or eliminated is the most efficient. In contrast, the void spaces between carbon particles can be important for ensuring sufficient adsorbate contact and for the passage of fluid without excessive pressure drop in other applications.

Efforts to produce high-density solid activated carbon structures have resulted in numerous compression and binding techniques. For example, a method for producing a conglomerated activated carbon mass that includes a polymer rendered adhesive (U.S. Pat. No. 4,000,236), a method of producing a carbonaceous material with carbon particles with a binder (U.S. Pat. No. 4,717,595), a method of producing an activated carbon structure with a methyl cellulose binder (U.S. Pat. No. 5,306,675), and a method of producing a activated-carbon monolith with a polymeric binder (U.S. Pat. No. 6,207,264).

However, conventional techniques for activated carbon monolith production are problematic. For example, the high temperatures required during monolith production (e.g., about 800° C.) and off gas production (e.g., HCl) significantly increases production costs. The high cost of production is cost prohibitive for use for some market, e.g. natural gas storage. By way of further example, the convention techniques can result in loss of surface area, are not environmentally friendly, and overly fragile green state.

Binders are also known to plug activated carbon pores, thereby disrupting the pore-size distribution. The obstruction of porosity is a result of binders wetting out to form films that laminate the surface of activated carbon. The thickness and degree of lamination on the surface is dependent on numerous variables including the amount water in the mixture. A drawback of activated carbon is in the large volume or porosity, which requires copious amounts of water to wet the surface after the pore volume has been filled. As a result of the obstructed porosity, traditional activated carbon monoliths have reduced surface area, lower adsorption capacity, and larger pore sizes. In addition, the high degree of water addition required for processing leads to longer process times for drying materials. In particular, use of polymeric resins to bind activated carbon with very high surface areas (>2000 m$^2$/g) result in greatly reduced surface area and poor mechanical strength. Inorganic binders, for example clay, have been utilized to increase mechanical strength and do not obstruct porosity to the same degree as organic binders. However, use of such inorganic binders is costly (e.g., requiring firing at 900° C. in an inert atmosphere) and does not result in a sufficient increase in mechanical strength for many applications.

Filaments have been previously used in structures containing high moisture to facilitate drying. These additives have shown to increase the drying rate as reported in U.S. Pat. Nos. 3,615,311, 4,296,169, 4,364,883, and 5,100,474.

Many activated carbon applications require that the adsorbent be placed in devices of vary shapes and sizes. Standard binding methods, however, do not allow for the molding of activated carbon to the shapes and/or sizes required for such devices, while providing activated carbon monoliths with sufficient mechanical strength and very high surface areas that can be produced without the substantial costs from off gas production and high temperatures required during production, as discussed above.

Therefore, there is a need for an activated carbon monolith with a very high surface area and sufficient mechanical strength, and methods to produce an activated carbon monolith from activated carbon particles without a substantial loss in carbon surface area, while achieving the mechanical strength required.

SUMMARY

The present description relates to a porous gas sorbent monolith (e.g. an activated carbon monolith), methods of making a porous gas sorbent monolith, and applying the same. It was surprisingly and unexpectedly discovered that certain combinations of adsorbent (e.g., activated carbon), a binder and a scaffold material provided an adsorbent monolith with superior strength to mechanical stress, higher volumetric performance in swing adsorption for a specific adsorbent, while the addition of the elongated scaffold did not significantly alter the drying rate of the monolith.

Thus, in certain embodiments, a microporous or nanoporous, monolithic carbonaceous article is disclosed herein. The article comprises adsorbent material (e.g., activated carbon), a binder, and a scaffold material. In certain embodiments, the scaffold material has a glass transition temperature no greater than 250° C.

In another embodiment, an adsorbent monolith is disclose herein. The monolith comprises adsorbent material (e.g., activated carbon), a binder, and a scaffold material. In a particular embodiment, the binder is present in an amount of 20 wt. % or less. In another embodiment, the adsorbent (e.g., activated carbon) is present in an amount of at least 77 wt. %. In certain embodiments, the adsorbent monolith comprises no greater than 3 wt. % of the scaffold material.

In another aspect of the present disclosure, a method of making a porous gas sorbent monolith it disclosed herein. The method comprises: admixing an adsorbent (e.g., activated carbon), a binder, and a scaffold material; compressing the admix into a shaped structure; and applying heat to the compressed admix.

In a certain embodiment, at least one of: the adsorbent (e.g., activated carbon) is present in an amount of at least 77 wt. %; the binder is present in an amount no greater than 20 wt. %; and the scaffold material is present in an amount no greater than 3 wt. %.

In another aspect of the present disclosure, a gaseous hydrocarbon storage system is described herein. The system comprises: a container; and at least one porous gas sorbent monolith according to the present disclosure. That is, the porous gas sorbent monolith includes adsorbent, a binder, and a scaffold material.

In a certain embodiment, the tank of the gaseous hydrocarbon storage system is configured to withstand at least 1,000 psi (pounds per square inch).

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages, objects and embodiments are expressly included within the scope of the present disclosure. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the invention. The drawings are only for the purpose of illustrating an embodiment of the present disclosure and are not to be construed as limiting the invention. Further objects, features and advantages of the invention will become apparent from the following detailed description taken in conjunction with the accompanying figures showing illustrative embodiments of the present disclosure, in which.

DETAILED DESCRIPTION

Figure 1:
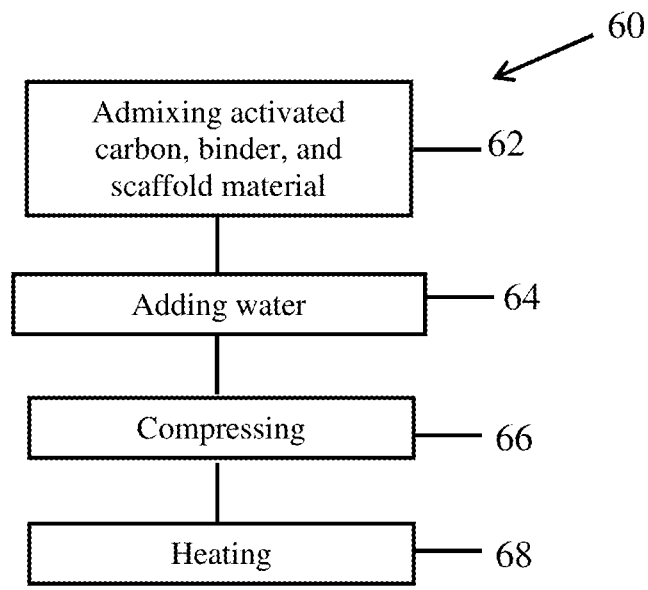
FIG. 1 is a flow diagram of a method of making an activated carbon monolith as disclose herein.

The following is a detailed description provided to aid those skilled in the art in practicing the present invention. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Presently described are adsorbent monoliths and methods of making the same, as well as a gaseous hydrocarbon storage system using the same, all of which relate to the surprising and unexpected discovery that certain combinations of an adsorbent, a binder, and a scaffold material can be used to produce less expensive adsorbent monoliths with greater surface area and mechanical strength. That is, the combination provides sufficient mechanical strength to produce adsorbent monoliths.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. Unless otherwise defined, all technical and scientific terms used herein have the same meaning as commonly understood by one of ordinary skill in the art to which this invention belongs. The terminology used in the description is for describing particular embodiments only and is not intended to be limiting of the invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

In one aspect, the disclosure provides a highly adsorbent monolithic article comprises an adsorbent (e.g., activated carbon powder), a binder, and a scaffold material. In an embodiment, the article has an open pore structure, a surface area in a range of about 1,000 $m^2/g$ to about 2,000 $m^2/g$, an average pore size in a range of about 0.6 angstrom to about 1.4 angstrom, or a pore volumes in a range of about 0.6 cc/g to about 1.5 cc/g.

Thus, in certain embodiments, the description provides a porous gas sorbent monolith comprising adsorbent, a binder, and a scaffold material.

In a particular embodiment, a microporous or nanoporous, monolithic carbonaceous article comprising an adsorbent (e.g., activated carbon), a binder, and a scaffold material. In certain embodiments, the scaffold material has a glass transition temperature between about 230° C. and about 270° C. In a particular embodiment, the binder is present in an amount of 20 wt. % or less. In another embodiment, the adsorbent is present in an amount of at least 77 wt. %. In a certain embodiment, the scaffold material is present in an amount no greater than 3 wt. %.

In any of the aspects or embodiments described herein, the adsorbent is selected from the group consisting of silica gel, zeolites, and activated carbons. The adsorbent can be silica gel, zeolites, activated carbons, or other adsorbent that is known or becomes known to those of skill in the art. For example, the adsorbent can be activated carbon from a variety of raw materials including wood, peat, coal, coconut, synthetic or natural polymer and a variety of processes including chemical and/or thermal activations. Furthermore, the adsorbent could be an inorganic adsorbents selected from the group consisting of molecular sieves, porous alumina, pillared clays, porous silica, zeolites, and metal organic frameworks.

In any of the aspects or embodiments described herein, the adsorbent is activated carbon. In any of the aspects or embodiments described herein, the activated carbon is in the form of a fine powder. Activated carbon is a non-graphitic microcrystalline form of carbon processed into carbon particles with relatively high microporosity. Activated carbon is comprised of six-member carbon rings with areas of disorganized carbon therebetween. The International Union of Pure and Applied Chemistry classifies pores according to their width. Micropores include pores that are less than about 2 nanometers in diameter. Mesopores includes pores that are about 2 to about 50 nanometers in diameter. Macropores are pores that are more than 50 nanometers in diameter. In an embodiment, the activated carbon has an open pore structure, a surface area in a range of about 1,800 $m^2/g$ to about 2,300 $m^2/g$ of the article, an average pore size in a range of about 0.8 nanometers to about 2.6 nanometers and pore volumes in a range of about 0.9 cc/g to about 1.5 cc/g.

Surface area of activated carbon can be determined in accordance with the well-known Brunauer-Emmet-Teller (BET) adsorption technique. The BET method usually adopts non-corrosive gases (e.g., nitrogen, argon, etc.) as adsorbates in the determination of the surface area of a material. All of the above measurement and determination procedures are well known to those skilled in the art. Activated carbon can have a BET surface area in the range of 450 to >5000 m$^2$/g with various types of porosity, as described above. One can vary the activated carbon's particle size, surface area, adsorption capacity for hydrocarbons, adsorption efficiency, porosity, pore size, etc., to meet the particular application. Furthermore, either a single type or a blend of types of activated carbon can be used depending upon the application.

Pore volume and pore size distribution is determined by, e.g., using N$_2$ gas to collect isotherms from low pressures to saturation pressure. The pore size range and pore volumes are derived from the pressure vs. quantity adsorbed data pairs using Micromeritics Instrument Corp. NLDFT and HNLDFT models. All of the above measurements and determination procedures are well known to those skilled in the art.

Methane or Natural Gas adsorption performance was determined on a system equipped with 4 ports, each characterized with a digital pressure readout, digital temperature readouts, and pressure transducer appropriately rated for the test pressures. Samples were loaded into the cylinder by coring fitted parts for the sample holder, approximately 5.5 inch in height and 0.75 inch in diameter. The sample holders were equipped with internal thermocouples to monitor and control sample temperature when pressurized with probe gas. Samples were placed in the sample holders followed by weight sample holders then outgassing conducted for >3 hours at 300° F. while under vacuum. Samples were brought to room temperature and the weight was recorded. The samples were then pressurized with probe gas to test pressure (900 psig unless otherwise noted). Samples were allowed to reach equilibrium which is defined as when the digital pressure readout change is less than 0.1% over 10 minutes. The sample holders were weighed again to determine quantity of gas in test cylinder. The pressurized sample holder was then depressurized isothermally until ambient pressure was reached (about 14.6 psig). The sample holder was weighed again. The total gas in the sample holder and gas irreversibly adsorbed was determined by the weight obtained during the experiment. The amount of gas adsorbed was derived from the experimental weights.

In an embodiment, the activated carbon has a BET surface area in a range of about 600 m$^2$/g to about 3,000 m$^2$/g. Furthermore, the activated carbon can have an average pore size ranging from about 0.8 nm (nanometers) to about 3.5 nm. In a particular embodiment, the activated carbon has a BET surface area in a range of about 1,800 m$^2$/g to about 2,300 m$^2$/g. In certain embodiments, the activated carbon has a pore volume of 0.5 cc/g to about 2.0 cc/g. In some embodiments, the activated carbon has a particle size in a range of about 10 μm (microns) to about 2.83 mm (millimeters). In particular embodiments, the active carbon has a particle size in a range of about 15 μm to about 120 μm.

In any of the aspects or embodiments described herein, the article comprises about 95 wt. % to about 70 wt. % activated carbon. In a particular embodiment, the activated carbon is present in a range of about 82 wt. % to about 92 wt. %. In certain embodiments, the activated carbon is present in a range of about 75 wt. % to about 95 wt. %, about 75 wt. % to about 90 wt. %, about 75 wt. % to about 85 wt. %, about 75 wt. % to about 80 wt. %, about 80 wt. % to about 95 wt. %, about 80 wt. % to about 90 wt. %, about 80 wt. % to about 85 wt. %, about 85 wt. % to about 95 wt. %, about 85 wt. % to about 90 wt. %, or about 90 wt. % to about 95 wt. %. In particular embodiments, activated carbon can be present in about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, or about 95 wt. %.

In an embodiment, activated carbon suitable for use in practicing the present disclosure is commercially available from MWV Specialty Chemicals, North Charleston, S.C., USA, under the designation Nuchar® SA-1500, Nuchar® WV-A 1500, Nuchar® WV-A 1500, and double activated carbon (e.g. Nuchar® WV-A-1100). In certain embodiments, suitable activated carbon includes coconut activated carbon and coal-based activated carbon.

In any of the aspects or embodiments described herein, the binder can comprise any suitable binder generally known in the art or that becomes known. Those of skill in the art will recognize that certain types of binders are particularly useful for microporous or nanoporous, monolithic carbonaceous articles, which are expressly contemplated herein. For example, in certain embodiments, the binder is at least one of methylcellulose, methylcellulose ether, hydroxybutylmethylcellulose, hydroxypropylmethylcellulose, sodium alginate, hydroxyethylmethylcellulose, carboxymethylcellulose (CMC) and its derivatives and its metal salts (e.g. sodium carboxymethylcellulose), Teflon, waterlink sutcliffe carbons, novolac phenolic resin, humic acid-derived sodium salt, guar gum cellulose, starch, lignin, polyvinyl alcohol, polyacrylic acid, styrene butadiene resins (SBR), phenolic resin, polystyrene acrylic acid resins, reaction products of polyacrylic acid with polyols selected from the group of glycerin, polyvinyl alcohol, lignin and hydroxyethylcellulose, as well as derivatives and mixtures thereof.

In certain embodiments, the article comprises from about 5.0 wt. % to about 20 wt. % of binder based on the total weight of the activated carbon monolith. The binder may be present in a range of about 5 wt. % to about 18 wt. %, about 5 wt. % to about 16 wt. %, about 5 wt. % to about 14 wt. %, about 5 wt. % to about 12 wt. %, about 5 wt. % to about 10 wt. %, about 5 wt. % to about 8 wt. %, about 7 wt. % to about 20 wt. %, about 7 wt. % to about 18 wt. %, about 7 wt. % to about 16 wt. %, about 7 wt. % to about 14 wt. %, about 7 wt. % to about 12 wt. %, about 7 wt. % to about 10 wt. %, about 9 wt. % to about 20 wt. %, about 9 wt. % to about 18 wt. %, about 9 wt. % to about 16 wt. %, about 9 wt. % to about 14 wt. %, about 9 wt. % to about 12 wt. %, about 11 wt. % to about 20 wt. %, about 11 wt. % to about 18 wt. %, about 11 wt. % to about 16 wt. %, about 11 wt. % to about 14 wt. %, about 13 wt. % to about 20 wt. %, about 13 wt. % to about 18 wt. %, about 13 wt. % to about 16 wt. %, about 15 wt. % to about 20 wt. %, about 15 wt. % to about 18 wt. %, or about 17 wt. % to about 20 wt. %. In an exemplary embodiment, the binder is present in an amount of about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt %, about 15.5 wt. %, about 16 wt. %, about 16.5 wt. %, about 17 wt. %, about 17.5 wt. %, about 18 wt. %, about 18.5 wt. %, about 19 wt. %, about 19.5 wt. %, or about 20 wt. %.

In any of the aspects or embodiments described herein, the scaffold material can comprise a suitable scaffold material or combination of scaffold materials, which are generally known in the art or that becomes known. In some embodiments, for example, the scaffold material can comprise at least one fiber. In certain embodiments, the fiber is a natural fiber, a synthetic fiber or a combination thereof. That is, the article can comprise a natural fiber, a synthetic fiber, and/or both a natural and synthetic fiber. Fibers are a class of hair-like materials that can be either continuous filaments or are in discrete elongated pieces.

Natural fibers are made from plant, animal and mineral sources. For example, the natural fiber can comprise at least one of: seed fibers (e.g. cotton and kapok), leaf fibers (e.g. sansevieria, fique, sisal, banana and agave), bast/skin fibers (e.g. flax, jute, kenaf, industrial hemp, ramie, rattan and vine fibers), fruit fibers (e.g. coconut fibers), stalk fibers (straw of wheat, rice, barley, bamboo, grass and tree wood fibers), and animal fibers (e.g. sheep's wool, goat hair, alpaca hair, horse hair, Angora fibers, silk fiber, avian fibers, and catgut, which is a natural fiber prepared from the walls of animal intestines). In a particular embodiment, the natural fiber is alpaca fibers.

Synthetic fibers are fibers manufactured with fiber forming materials. The synthetic fiber can comprise at least one of: cellulosic fibers (e.g. regenerated cellulose, cellulose triacetate, Rayon, Acetate and Arnel), aramid fibers (e.g. poly-p-phenylene terephthalamide and poly-m-pheylene isophthalamide), polyimide fibers, carbon fibers, graphite fibers, acetate fibers, triacetate fibers, acrylic and modacrylic fibers, elastomeric fibers, spandex fibers, elastoester fibers, fluoropolymer fibers, nylon fibers, polyolefin fibers, polyester fibers (e.g. polyethylene terephthalate), polyacrylonitrile fibers (e.g. acrylic fibers (>85% acrylonitrile) and modacrylic (35-85% acrylonitrile) and, polyurethane fibers (e.g. Spendex and Lycra), polyamide fibers (e.g. polycaprolactam, polyhexamethylene adipamide, polycaprolactam, and polyhexamethylene), polyethylene fibers (e.g. Dyneema and Spectra), polypropylene fibers (e.g. Heculon and Marvess), polyphenylene sulfide (PPS) fibers, polyvinyl chloride fibers, vinyl fibers, vinyon fibers, vinal fibers, and rayon fibers.

In a particular embodiment, the synthetic fiber is at least one of polypropylene fibers, polyester fibers, 4DG™ Fibers or a combination thereof. 4DG™ Fibers are available from Fiber Innovation Technology, Johnson City, Tenn., 37604, and have a cross-sectional shape such that, there are grooves along the length of the fiber.

In a particular embodiment, the scaffold material is less than about 1 inch in length. In a certain embodiment, the scaffold material is about 0.1 inches to about 1 inch in length. In particular embodiments, the scaffold material has a length of: about 0.1 inches to about 1 inches; about 0.1 inches to about 0.9 inches; a about 0.1 inches to about 0.8 inches; about 0.1 inches to about 0.7 inches; about 0.1 inches to about 0.6 inches; about 0.1 inches to about 0.5 inches; about 0.1 inches to about 0.4 inches; about 0.1 inches to about 0.3 inches; about 0.2 inches to about 1 inch; about 0.2 inches to about 0.9 inches; about 0.2 inches to about 0.8 inches; about 0.2 inches to about 0.7 inches; about 0.2 inches to about 0.6 inches; about 0.2 inches to about 0.5 inches; about 0.2 inches to about 0.4 inches; about 0.2 inches to about 0.3 inches; about 0.3 inches to about 1 inch; about 0.3 inches to about 0.9 inches; about 0.3 inches to about 0.8 inches; about 0.3 inches to about 0.7 inches; about 0.3 inches to about 0.6 inches; about 0.3 inches to about 0.5 inches; about 0.3 inches to about 0.4 inches; about 0.4 inches to about 1 inch; about 0.4 inches to about 0.9 inches; about 0.4 inches to about 0.8 inches; about 0.4 inches to about 0.7 inches; about 0.4 inches to about 0.6 inches; or about 0.4 inches to about 0.5 inches. In particular embodiment, the scaffold material has a length of about 0.05 inches, 0.1 inches, about 0.15 inches, about 0.2 inches, about 0.25 inches, about 0.3 inches, about 0.35 inches, about 0.4 inches, about 0.45 inches, about 0.5 inches, about 0.55 inches, about 0.6 inches, about 0.7 inches, about 0.8 inches, about 0.9 inches, or about 1 inch.

In some embodiments, the scaffold material is present in an amount no greater than 3 wt. %. The scaffold material can be present in an amount of about 0.25 wt. % to about 3 wt. %. In a particular embodiment, the scaffold material is present in an amount no greater than about 2 wt. %. In a certain embodiment, the scaffold material is present in a range of about 1 wt. % to about 2 wt. %. In other embodiments, the scaffold material is present in a range of about 0.5 wt. % to about 2.5 wt. %, or about 0.75 wt. % to about 2.25 wt. %. In particular embodiments, the scaffold material is present in an amount of about 0.25 wt. %, about 0.5 wt. %, about 0.75 wt. %, about 1 wt. %, about 1.25 wt. %, about 1.5 wt. %, about 1.75 wt. %, about 2 wt. %, about 2.25 wt. %, about 2.5 wt. %, about 2.75 wt. %, or about 3 wt. %.

It is to be understood, that the activated carbon monolith can be formed into any shape desired, e.g. a prism, including a cylinder, an oval prism, a cube, an elliptical prism, a rectangular prism, a pentagonal prism, etc., or even an irregular three dimensional shape. A prism may be a shape with two congruent parallel faces (i.e., bases), where any cross section parallel to those faces is congruent to them, and in which the bases are separated by a height. In a particular embodiment, the cylinder shaped activated carbon monolith has a diameter of at least about 3.50 inches (e.g., at least about 3.75 inches or about 3.75 inches to about 11 inches) and a thickness of at least about 0.75 inch (e.g., at least about 1 inch or about 0.75 inch to about 10 inches). In another embodiment, the prism has a base (e.g., a circle, an oval, a square, an ellipse, a rectangle, or a pentagon of a cylinder, an oval prism, a cube, an elliptical prism, a rectangular prism, or a pentagonal prism, respectively) with at least one axis, side, or diameter that is at least 3.5 inches (e.g., at least 3.75 inches or about 3.75 inches to about 11 inches) and/or the prism has a height that is at least 0.75 inches (e.g., at least 1 inch or at least 0.75 inches to about 10 inches).

In an embodiment, the activated carbon monolith can withstand the application of about 12 psi to about 17 psi (e.g., about 12.8 psi to about 15 psi or about 13.5 psi) applied to a surface of the activated carbon monolith for about 4 to 7 seconds (e.g., about 5 seconds or about 4 to about 6 seconds). Preferably, the force is applied evenly across the entire surface of the activate carbon monolith, e.g. the surface of a base of a prism that is separated from a second base surface by a height. Each of the bases is preferably in contact with a hard surface that lacks a substance that absorbs impact (or a substance that substantially absorbs impact).

The activated carbon monoliths described herein are a highly adsorbent, shape-specific designed monolith article. The binder and scaffold material significantly increase the packing density of the adsorbent compared to normal packed activated carbon powder. As a result, the activated carbon monoliths of the present disclosure provide higher volumetric performance in swing adsorption. Furthermore, the use of shape-specific monolith articles simplifies the production of gaseous hydrocarbon storage systems because the activated carbon may be handled in the monolith form. The monolithic articles of the present disclosure produce markedly less activated carbon dust plumes when handled, as compared to activated carbon powder, which poses an inhalation hazard to workers and requires a dust collection ventilation system.

Figure 3:
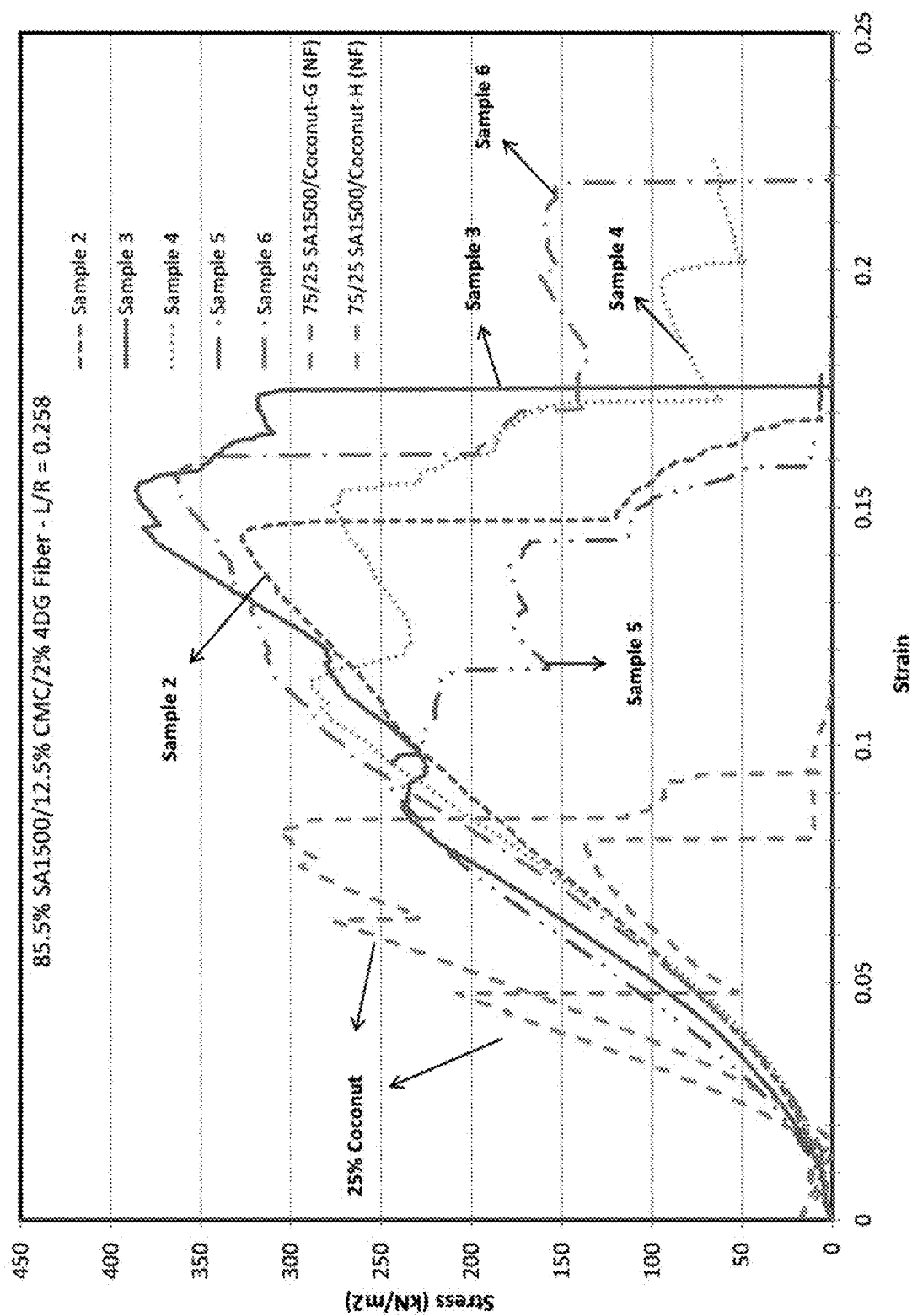
FIG. 3 is a graph comparing activated carbon monoliths that include 25 wt. % coconut carbon to activated carbon monoliths that include scaffold material (samples 2-6). To determine toughness monoliths having diameters of about 4 inches and about 1 inch thick were placed radially on a Cox & Sons Automatic Concrete Compression with a load cell of 5,000 lbs. Samples were placed so that the force was applied in the radial direction (across the cross section of the sample). The shaft was lowered at a rate of 15 mm/second. The toughness was calculated as the area under the stress-strain curve where stress is calculated from the test by dividing the applied force by the cross-sectional area of the sample. Strain was calculated from the experimental data by subtracting the height of the sample at time=x from the height of the sample at time=0 divided by height at time=0, where x is increments of 0.1 seconds. Temperature is kept constant at 22° C.±1° C.

According to another aspect of the present disclosure, as shown in FIG. 3, a method of making a porous gas adsorbent monolith (e.g. an activated carbon monolith or a microporous or nanoporous, monolithic carbonaceous article) 60 is described herein. The method comprises: admixing activated carbon, a binder, and scaffold material 62; and compressing the admix into a shaped structure 66. In a certain embodiment, the method further includes heating the shaped admix 68, thereby drying (i.e. curing) the shaped admix. The admix can be mixed by any suitable method known in the art or becomes known. For example, a mixer may be selected from the group consisting of a muller, a plow, a sigma blade or ribbon blender and a pin mixer. In certain embodiments, admixing 62 occurs for a period of 10-15 minutes.

In a particular embodiment, the method further comprises adding water to the admix 64. For example, water can be added in an amount sufficient to achieve moisture in a range of about 50% to about 65% or about 53% to about 62%. In particular embodiments, the moisture range of the admix is about 50%, about 51%, about 52%, about 53%, about 54%, about 55%, about 56%, about 57%, about 58%, about 59%, about 60%, about 61%, about 62%, about 63%, about 64%, or about 65%.

The amount and characteristics of the activated carbon, the binder, and the scaffold material are described above with regards to the embodiments of the activated carbon monolith.

In an embodiment, the activated carbon, binder and scaffold material are dry mixed, e.g., about 5 minutes in a mixer. Water can be added to result in a mixture with 64 wt. % moisture content. Mixing can continue for an additional about 30 to about 40 minutes.

In a particular embodiment, the mixture is extruded. For example, a stiff extruder can be utilized. The stiff extruder can have about a 10 inch augur, thereby producing about 8 inch diameter extrudate logs when equipped with an 8 inch barrel die. Subsequently, the logs can be cut to provide parts for drying. For example, the parts can have a thickness of about 0.75 inch to about 3 inches. In certain embodiments, the monolith is dried at about 100° C. to about 120° C. (e.g., about 110° C.) for about 9 to about 11 hours (e.g., about 10 hours).

In any of the aspects or embodiments described herein, the admix or binder can include at least one of emulsifying agent(s), rheological aid(s), and thickening agent(s). For example, the binder can be emulsified in an aqueous medium. The binder can first be dissolved in the emulsifying agent, such as an organic or water-insoluble solvent, which can be either non-polar (e.g. toluene) or polar (e.g. tetrahydrofuran). In a further embodiment, a surfactant can be used to aid in the emulsification of the binder. For example, the surfactant can be an anionic, cationic, non-ionic, or an amphoteric surfactant. Other agents are not contemplated in the production of the monolith (e.g., emulsifying agents, rheological aids, thickening agents and surfactants).

Thickening agents can be used to impart greater fluidity to the admixture. In any of the aspects or embodiments described herein, the method further includes adding a thickener to the pre-wet activated carbon. The thickener can include any suitable thickening agent generally known in the art, or that becomes known. For example, suitable thickening agents include water-soluble polymers, such as methylcellulose, methylcellulose ether, and polyacrylic acid.

In any of the aspects or embodiments described herein, compressing the admix 66 into a shaped structure is formed into the desired shape by extrusion or a mold. That is, to form the desired shape of the activated carbon monolith, the admix can be cast in a mold. In another embodiment, the admix is extruded into the desired shape with any known and commercially available extruder. It is to be understood, that the activated carbon monolith can be formed into any shape desired, e.g. circular, oval, elliptical, rectangular, triangular, pentagonal, etc. In a particular embodiment, the pressure applied is at least 15,000 psi. For example the pressure applied is in a range of: about 10,000 psi to about 60,000 psi; about 10,000 psi to about 55,000 psi; about 10,000 psi to about 50,000 psi; about 10,000 psi to about 45,000 psi; about 10,000 psi to about 40,000 psi; about 10,000 psi to about 35,000 psi; about 10,000 psi to about 25,000 psi; about 10,000 psi to about 20,000 psi; about 10,000 psi to about 15,000 psi; about 15,000 psi to about 60,000 psi; about 15,000 psi to about 55,000 psi; about 15,000 psi to about 50,000 psi; about 15,000 psi to about 45,000 psi; about 15,000 psi to about 35,000 psi; about 15,000 psi to about 30,000 psi; about 15,000 psi to about 25,000 psi; about 15,000 psi to about 20,000 psi; about 20,000 psi to about 60,000 psi; about 20,000 psi to about 55,000 psi; about 20,000 psi to about 50,000 psi; about 20,000 psi to about 45,000 psi; about 20,000 psi to about 40,000 psi; about 20,000 psi to about 35,000 psi; about 20,000 psi to about 30,000 psi; about 20,000 psi to about 25,000 psi; about 25,000 psi to about 60,000 psi; about 25,000 psi to about 55,000 psi; about 25,000 psi to about 50,000 psi; about 25,000 psi to about 45,000 psi; about 25,000 psi to about 40,000 psi; about 25,000 psi to about 35,000 psi; about 25,000 psi to about 30,000 psi; about 30,000 psi to about 60,000 psi; about 30,000 psi to about 55,000 psi; about 30,000 psi to about 50,000 psi; about 30,000 psi to about 45,000 psi; 30,000 psi to about 40,000 psi; about 30,000 psi to about 35,000 psi; about 35,000 psi to about 60,000 psi; about 35,000 psi to about 55,000 psi; about 35,000 psi to about 50,000 psi; about 35,000 psi to about 45,000 psi; about 35,000 psi to about 40,000 psi; about 40,000 psi to about 60,000 psi; about 40,000 psi to about 55.00 psi; about 40,000 psi to about 50,000 psi; about 40,000 to about 45,000 psi; about 45,000 psi to about 60,000 psi; about 45,000 psi to about 55,000 psi; about 45,000 psi to about 50,000 psi; about 50,000 psi to about 60,000 psi; about 50,000 psi to about 55,000 psi; or about 55,000 psi to about 60,000 psi.

In any of the aspects or embodiments described herein, the method can further comprise heating (i.e. drying or curing) the shaped admix 68. In a particular embodiment, heating the shaped mixture includes pre-drying the shaped admix. Pre-drying can be for a period of about 24 hours to about 72 hours at an elevated temperature, for example about 40° C. to about 50° C. In a certain embodiment, drying is performed at a temperature below the glass transition temperature of the scaffold material, for example in a range of 110° C. to about 250° C., for a period of time in a range of about 8 hours to about 36 hours. In some embodiments, drying includes heating the shaped mixture to a temperature in a range of about 110° C. to about 250° C., 110° C. to about 230° C., about 110° C. to about 220° C., about 110° C. to about 210° C., about 110° C. to about 200° C., about 110° C. to about 190° C., about 110° C. to about 180° C., about 110° C. to about 170° C., about 110° C. to about 160° C., about 120° C. to about 250° C., 120° C. to about 230° C., about 120° C. to about 220° C., about 120° C. to about 210° C., about 120° C. to about 200° C., about 120° C. to about 190° C., about 120° C. to about 180° C., about 120° C. to about 170° C., about 120° C. to about 160° C., about 130° C. to about 250° C., 130° C. to about 230° C., about 130° C. to about 220° C., about 130° C. to about 210° C., about 130° C. to about 200° C., about 130° C. to about 190° C., about 130° C. to about 180° C., about 130° C. to about 170° C., about 140° C. to about 250° C., about 140° C. to about 230° C., about 140° C. to about 220° C., about 140° C. to about 210° C., about 140° C. to about 200° C., about 140° C. to about 190° C., about 140° C. to about 180° C., about 140° C. to about 170° C., about 150° C. to about 250° C., about 150° C. to about 230° C., about 150° C. to about 220° C., about 150° C. to about 210° C., about 150° C. to about 200° C., about 150° C. to about 190° C., about 150° C. to about 180° C., about 150° C. to about 170° C., about 160° C. to about 250° C., about 160° C. to about 230° C., about 160° C. to about 220° C., about 160° C. to about 210° C., about 160° C. to about 200° C., about 160° C. to about 190° C., about 160° C. to about 180° C., or about 160° C. to about 170° C. In other embodiments, drying takes place at temperature of about 110° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., about 205° C., about 210° C., about 215° C., about 220° C., about 225° C., about 230° C., about 240° C., or about 250° C.

In a particular embodiment, drying the shaped admix 68 comprising applying a first drying temperature and applying a second drying temperature. In an embodiment, drying the shaped admix 68 comprising applying a first drying temperature and ramping to a second drying temperature. The first drying temperature can be, for example, in the range of about 110° C. to about 150° C. or about 110° C. to about 130° C. The second drying temperature can be, for example about 110° C. to about 180° C. or about 110° C. to about 150° C. The first drying temperature may be maintained for a period of about 4 to about 8 hours. The second drying temperature can be maintained, for example, for a period of about 8 to about 20 hours. In a particular embodiment, drying the shaped admix 68 comprises applying a first temperature of about 120° C. for about 5 to about 7 hours and applying a second temperature less than 150° C. (e.g., about 125° C. or about 130° C.) for a period of about 17 to about 19 hours. In a specific embodiment, applying the first drying temperature and the second drying temperature is for a period of about 24 hours or about 30 hours. It should be understood that drying the shaped admix can comprise pre-drying the shaped admix, applying a first drying temperature, and applying a second drying temperature or ramping to a second drying temperature.

As discussed above, rheological agent(s) can be used to adjust the rheological properties of the pre-wet activated carbon or the admix. In particular, such adjustments may be required depending upon the shaping method. For example, extrusion requires a gel-like consistency. In a certain embodiment, the method further includes adding a thickening agent to the admix. The thickening agent can include any suitable thickening agent generally known in the art, or that becomes known, as described above.

In a certain embodiment, the method further includes adding a thinning agent to the admix. The thinning agent can include any suitable thinning agent generally known in the art, or that becomes known. For example, the thinning agent can be surfactants, such as anionic, cationic and nonionic surfactants. Examples of anionic surfactants include, but are not limited to, carboxylates, phosphates, sulfonates, sulfates, sulfoacetates, and free acids of these salts, and the like. Cationic surfactants include salts of long chain amines, diamines and polyamines, quaternary ammonium salts, polyoxyethylenated long-chain amines, long-chain alkyl pyridinium salts, lanolin quaternary salts, and the like. Non-ionic surfactants include long-chain alkyl amine oxides, polyoxyethylenated alkyl phenols, polyoxyethylenated straight-chain and branched-chain alcohols, alkoxylated lanolin waxes, polyglycol esters, lignosulfate derivatives, octophenols, nonylphenols, polyethylene glycol monoethers, dodecylhexaoxylene glycol monoethers, naphthalene sulfonates, trisodium phosphate, sodium dodecylsulfate, sodium lauryl sulfate, and the like. The particular amount of surfactant used will vary and is discernible to those of ordinary skill in the art. For example, in an embodiment, the thinning agent is present in the admix in an amount sufficient to form an extrudable mixture.

Figure 2:
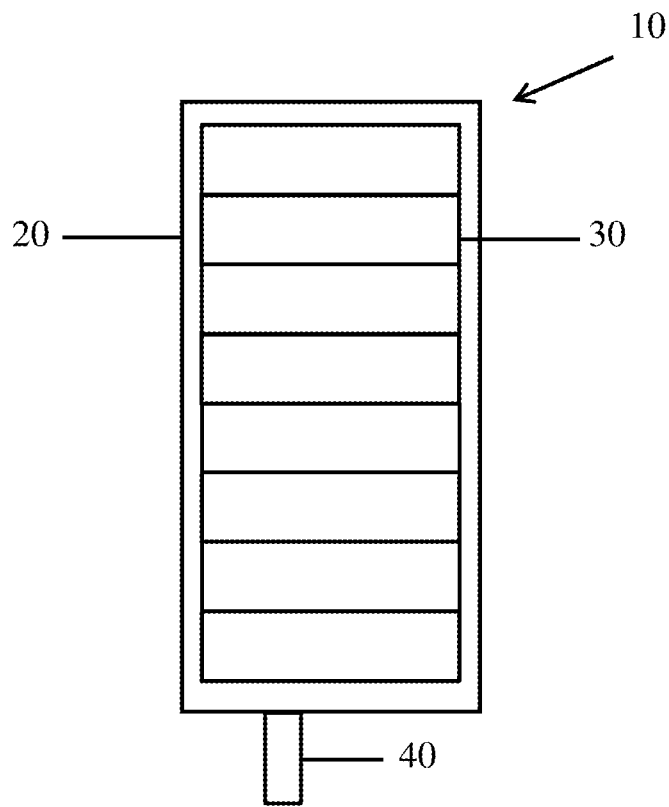
FIG. 2 illustrates an activated carbon monolith storage system as disclosed herein.

According to another aspect of the present disclosure, as shown in FIG. 2, a gaseous hydrocarbon storage system 10 is disclosed herein. The system comprises a container 20, and a microporous or nanoporous, monolithic carbonaceous article (i.e. a porous gas sorbent monolith or an activated carbon monolith) 30 that includes activated carbon, a binder, and a scaffold material. In a certain embodiment, the container is configured to withstand at least 1,000 psi of pressure.

In any of the aspects or embodiments described herein, the container 20 can comprise any suitable container generally known in the art or that becomes known. In a particular embodiment, the container 20 may be made of any material suitable for a reusable pressure vessel rated for a service pressure up to about 1,800 psi. In an embodiment, the pressure vessel is rated for a service pressure in a range of about 250 psi to about 1,800 psi, more specifically, about 450 psi to about 1,000 psi. Alternatively, the pressure vessel can be rated for a service pressure in a range of: about 250 psi to about 1,800 psi; about 250 psi to about 1,700 psi; about 250 psi to about 1,600 psi; about 250 psi to about 1,500 psi; about 250 psi to about 1,400 psi; about 250 psi to about 1,300 psi; about 250 psi to about 1,200 psi; about 250 psi to about 1,100 psi; about 250 psi to about 1,000 psi; about 250 psi to about 900 psi; about 350 psi to about 1,800 psi; about 350 psi to about 1,700 psi; about 350 psi to about 1,600 psi; about 350 psi to about 1,500 psi; about 350 psi to about 1,400 psi; about 350 psi to about 1,300 psi; about 350 psi to about 1,200 psi; about 350 psi to about 1,100 psi; about 350 psi to about 1,000 psi; about 350 psi to about 900 psi; about 450 psi to about 1,800 psi; about 450 psi to about 1,700 psi; about 450 psi to about 1,600 psi; about 450 psi to about 1,500 psi; about 450 psi to about 1,400 psi; about 450 psi to about 1,300 psi; about 450 psi to about 1,200 psi; about 450 psi to about 1,100 psi; about 450 psi to about 1,000 psi; about 450 psi to about 900 psi; about 550 psi to about 1,800 psi; about 550 psi to about 1,700 psi; about 550 psi to about 1,600 psi; about 550 psi to about 1,500 psi; about 550 psi to about 1,400 psi; about 550 psi to about 1,300 psi; about 550 psi to about 1,200 psi; about 550 psi to about 1,100 psi; about 550 psi to about 1,000 psi; or about 550 psi to about 900 psi. Examples of suitable container materials include high strength aluminum alloys (e.g. aluminum alloys in the 7000 series, which have relatively high yield strength), high strength low-alloy (HSLA) steels (e.g. aluminum 7075-T6), as well as plastic or low strength aluminum alloys (e.g., C-epoxy, glass fiber-polymer, strong polymer fibers such as Kevlar, Zylon, steel wires, belts, tapes, metallurgical coatings or any similar reinforcement, aluminum 6061-T6 or the like, and any combination thereof).

According to a particular embodiment, the desired activated carbon monolith 30 shape is one of rectangular or circular. However, it is to be understood that the shape and size of the container 20 and the activated carbon monolith 30 may vary depending on the particular use. Furthermore, while not shown, it is to be understood that the container 20 may be configured with other containers so that the multiple containers 20 are in fluid (e.g., gas) communication through a manifold or other suitable mechanism.

The activated carbon monolith 30 is positioned within the container 20. As discussed above, the activated carbon monolith 30 is at least capable of releasably retaining methane compounds (i.e., reversibly storing or adsorbing and desorbing methane molecules). In some examples, the activated carbon monolith 30 may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the activated carbon monolith 30 may be inert to some of the natural gas components and capable of releasably retaining other natural gas components.

In any of the aspects or embodiments described herein, the system 10 further comprises a device capable of charging and/or discharging the system. In a particular embodiment, the charging and/or discharging device is a port 30. It is to be understood that the device can be any suitable device generally known in the art or that becomes known capable of charging and/or discharging the system.

EXAMPLES

Example 1. Monoliths with Coconut Derived Activated Carbon without Scaffold Material Table 1 illustrates the modulus of toughness for activated carbon monoliths with coconut carbon. That is, monoliths that do not contain scaffold material. As used herein, "modulus of toughness" is the integrated area under the curve of a stress versus strain plot. The modulus of toughness value, i.e. the toughness value, relates to the energy of mechanical deformation per unit volume prior to fracture of the activated carbon monolith. Coconut carbon is a high toughness carbon, while Nuchar® SA-1500 is a very low toughness carbon. As shown in Table 1, an activated carbon monolith comprising 67.5 wt. % Nuchar® SA-1500, 22.5 wt. % coconut activated carbon, and 10 wt. % binder (CMC) has a toughness of 10.1. In contrast, increasing the coconut carbon to 45 wt. % results in a small increase in the toughness of the activated carbon monolith to 14.7.

TABLE 1

Toughness comparison of activated carbon monoliths containing coconut carbon.

| wt. % SA-1500 | wt. % Coconut Carbon | Toughness | Std. Deviation |
|---|---|---|---|
| 67.5 | 22.5 | 10.1 | 3.1 |
| 45 | 45 | 14.7 | 3.4 |

Example 2. Monoliths with Activated Carbon and Scaffold Material

Table 2 illustrates the modulus of toughness for activated carbon monoliths that include Nuchar® SA-1500 activated carbon, binder (CMC) and 2 wt. % 4DG polyester fibers of a length of ¼ inch and a denier of 6 pdf (i.e. scaffold material). Unexpectedly, the activated carbon monolith comprising 15 wt. % binder (CMC) and 83 wt. % Nuchar® SA-1500 demonstrated a toughness of 17.3, which is markedly stronger than the activated carbon monoliths of Table 1, which lack scaffold material. Surprising and unexpectedly, a decrease of the binder to 12.5% showed a marked increase in toughness to 29.2. In contrast to Table 1, which required a substantial increase of coconut carbon to achieve a 4.6 increase in toughness to 14.7, the 2.5 wt. % decrease in binder with 2% scaffold material resulted in a toughness increase of 11.9.

TABLE 2

Toughness comparison of activated carbon monoliths containing scaffold material.

| wt. % SA-1500 | wt. % Binder (CMC) | Toughness | Std. Deviation |
|---|---|---|---|
| 83 | 15 | 17.3 | 3.2 |
| 85.5 | 12.5 | 29.2 | 6.8 |

It should be noted that without the use of coconut carbon or scaffold material, the activated carbon monoliths are very friable. For this reason, activated carbon monoliths without coconut carbon and scaffold material could not be assessed for toughness as the monoliths are brittle and crumble upon the removal from the oven.

Example 3. Comparing Toughness of Monoliths with and without Scaffold Material

FIG. 3 is a graph of a stress versus strain plot comparing the toughness of 75 wt. % Nuchar® SA-1500-25 wt. % coconut (either G or H) to several exemplary activated carbon monoliths according to several embodiments of the present disclosure (samples 2-6). That is, samples 2-6 include 4DG polyester fibers of a length of ¼ inch and a denier of 6 pdf. FIG. 3 demonstrates that the inclusion of scaffold material significantly enhances toughness, as compared to coconut carbon. That is, as can be seen by the shift of the stress vs. strain plots for samples 2-6 to the right and upward, as compared to Nuchar® SA-1500-coconut monoliths, the activated carbon monoliths comprising scaffold material can withstand substantially greater mechanical deformation before fracturing, which is demonstrated by having substantially larger integrated area under the curve. That is, the scaffold material significantly enhances the toughness of activated carbon monoliths, as compared to activated carbon monoliths absent the scaffold material with or without coconut carbon.

Example 4. Examination of Monolith Drying

Figure 4:
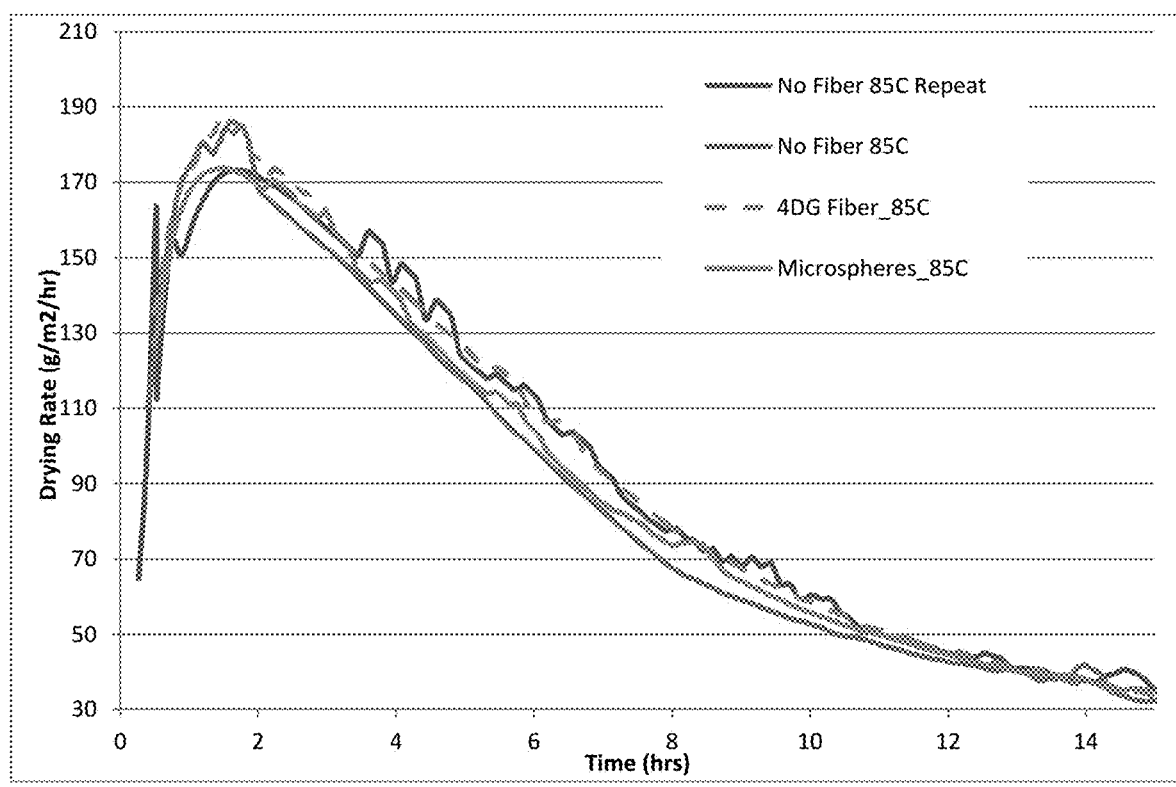
FIG. 4 is a graph comparing the drying rate between different activated carbon monoliths at 85° C. The drying rate was calculated from recording the experimental weight loss in an oven at a constant temperature of 85° C. The weight was measured every 20 seconds. The rate was calculated by dividing the weight loss by the surface area of the sample multiplied by the time from the start of the experiment. Said values are plotted against time to reveal how the drying rate changes during the test.
Figure 5:
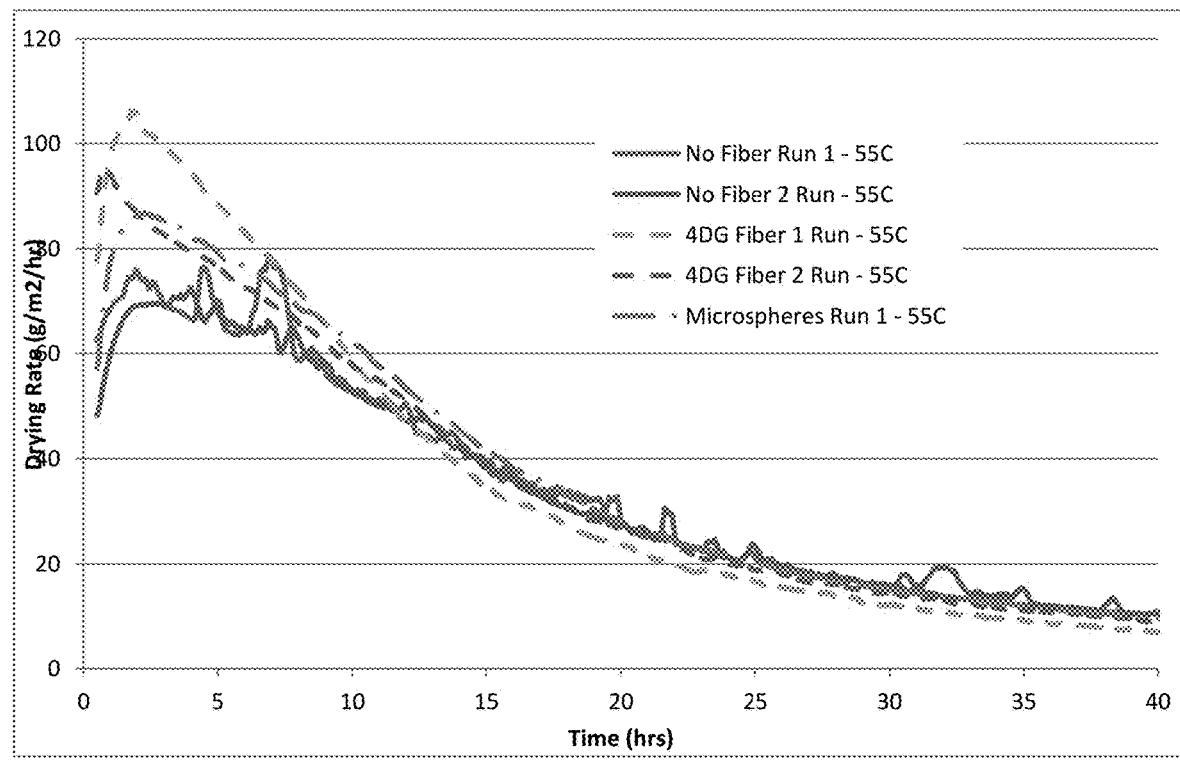
FIG. 5 is a graph comparing the drying rate between different activated carbon monoliths at 55° C. The drying rate was calculated from recording the experimental weight loss in an oven at a constant temperature of 55° C. The weight was measured every 20 seconds. The rate was calculated by dividing the weight loss by the surface area of the sample multiplied by the time from the start of the experiment. Said values are plotted against time to reveal how the drying rate changes during the test.

Monoliths/parts were dried in an oven equipped with a microbalance with a hanging wire mesh. Weight data was collected every 2 seconds. Parts were made with 85.5% Nuchar® SA 1500. Parts containing scaffold material or microspheres included 2 wt. % of the scaffold material (4DG) and 12.5 wt. % of binder (CMC). Parts without scaffold or microspheres had 14.5 wt. % binder (CMC). The initial wet parts had a diameter of 4" and a thickness of ¾". The parts were dried at either 85° C. (FIG. 4) or 55° C. (FIG. 5).

Figure 6A:
FIGS. 6A, 6B, and 6C are pictures of examples using Nuchar® SA-1500 activated carbon monoliths with microspheres, which failed to produce acceptable monoliths when dried at 55° C. (6A) or 85° C. (6B and 6C).
Figure 6B:
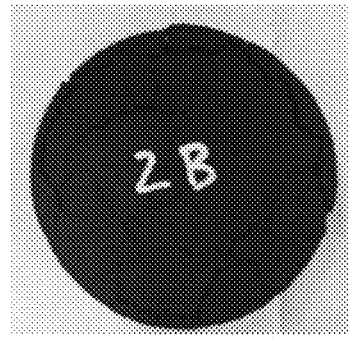
Figure 6C:
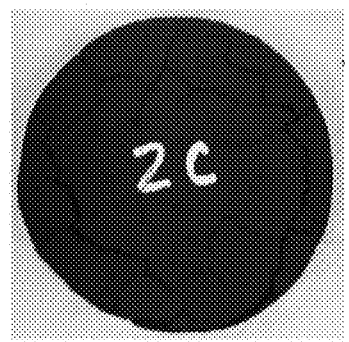
Figure 7A:
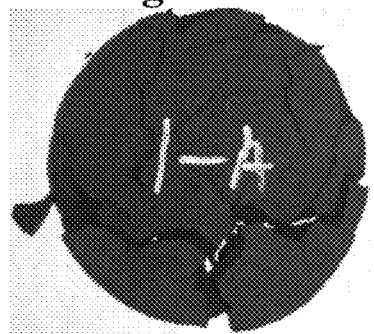
FIGS. 7A and 7B are pictures of examples using Nuchar® SA-1500 activated carbon monoliths without scaffold material (7A) or microspheres (7B) dried at 55° C.
Figure 7B:
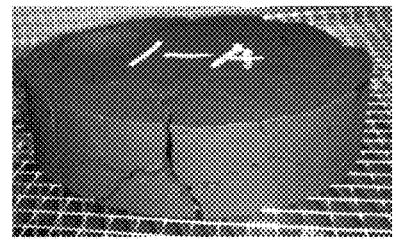
Figure 8A:
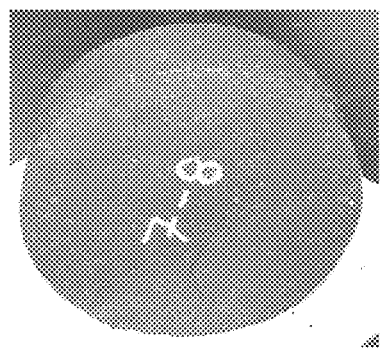
FIGS. 8A, 8B, 8C, 8D, 8E, and 8F are pictures of examples using Nuchar® SA-1500 activated carbon monoliths of the present disclosure.
Figure 8B:
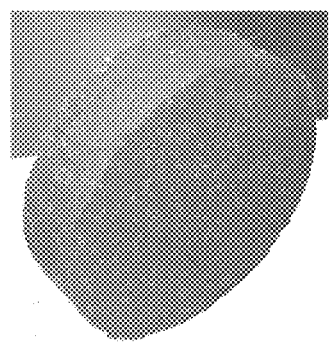
Figure 8C:
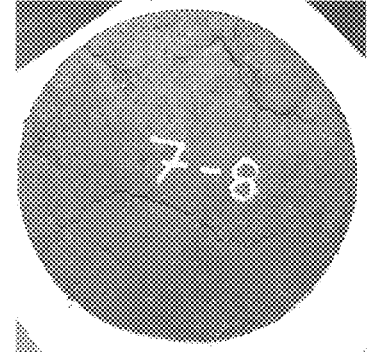
Figure 8D:
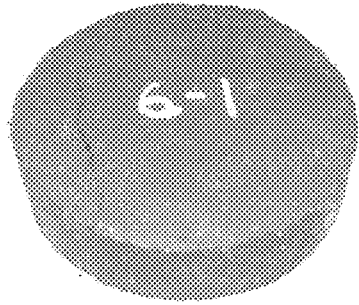
Figure 8E:
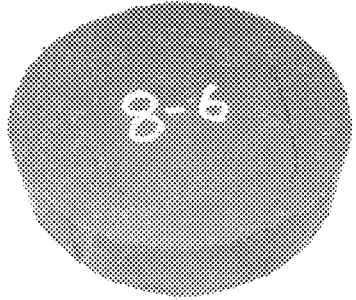
Figure 8F:
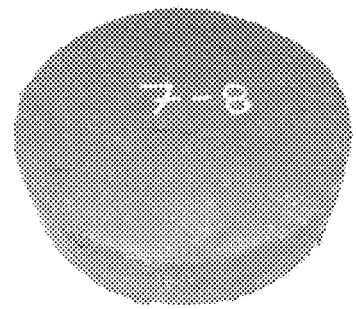

As shown in FIGS. 6A, 6B, and 6C, parts that contain microspheres (hollow glass beads of 30 micron diameter) failed to produce acceptable monoliths (i.e., there was substantial cracking) when dried at 55° C. (FIG. 6A) or 85° C. (FIGS. 6B and 6C). Similarly, drying parts that did not contain scaffold material or microspheres at 55° C. (FIGS. 7A and 7B) or 85° C. (data not shown) resulted in severely cracked monoliths.

Example 5. Examination of Structural Integrity of Monoliths with Varying Formulations Parts were produced with varying formulations and drying conditions. Table 3 shows the performance and structural integrity for each formulation-drying conditions combination. An activate carbon monolith of the present disclosure is considered to have an acceptable (or viable or good or adequate) structural integrity when the monolith does not separate (or break) when handled. For example, the monolith can include some cracks and/or have a pitted surface so long as it does not result in the monolith separating, cracking, or breaking when handled. Examples of monoliths of the present disclosure with acceptable (or viable or good or adequate) structural integrity are shown in FIGS. 8A, 8B, 8C, 8D, 8E, and 8F. The relative larger cracks do not compromise handling or transporting parts, but does result in a decrease in the amount of activated carbon. However, the volume that is attributed to a few larger cracks of a monolith is relatively insignificant and therefore, has a relatively insignificant effect on the capacity of the monolith of the present disclosure.

TABLE 3

Examination of monolith structural integrity

| Formulation (wt. %) | Drying Condition | Performance: 1. Apparent density 2. Volume Capacity 3. Grav. Capacity | Structural Integrity |
|---|---|---|---|
| 85.5% SA1500 14.5% CMC | Held at 55° C. | N/A | None, fell apart in oven (see FIGS. 7A and 7B) |
| 85.5% SA1500 12.5% CMC 2% PET Fiber | Held at 50° C. for 48 hours, then held at 165° C. for 16 hours | $\rho$ = 0.532 g/cc NGWC = 123.9 V/V NG Act. = 12.1 g/kg | Good |
| 85.5% SA1500 12.5% CMC 2% PET Fiber | Held at 110° C. for 10 hours | $\rho$ = 0.525 g/cc MWC = 124.9 V/V Meth Act. = 12.5 g/kg | Good |
| 90% SA1500 8% CMC 2% PET fiber | Held at 110° C. for 5 hours, then 165° C. for 16 hours | $\rho$ = 0.46 g/cc NGWC = 120.7 V/V NG Act. = 14.5 g/kg | Good |
| 85.5% SA1500 12.5% CMC 2% PLA Fiber | Held at room temperature for 24 hours, then 50° C. for 48 hours, then 120° C. for 24 hours | $\rho$ = 0.566 g/cc MWC = 124.4 V/V Meth Act. = 11.3 g/kg | Good |
| 85.5% SA1500 12.5% CMC 2% Nylon-6,6' fiber | Held at room temperature for 24 hours, then 50° C. for 48 hours, then 120° C. for 24 hours | $\rho$ = 0.575 g/cc MWC = 121.8 V/V Meth Act. = 12.1 g/kg | Good, the monolith can easily be handle without breaking |
| 90% RGC SA1500 10% CMC | Held at room temperature 24 hours, then at 165° C. for 16 hours | $\rho$ = 0.526 g/cc NGWC = 128.6 V/V NG Act. = 14.3 g/kg | Good, the monolith can easily be handle without breaking |
| 95% Coconut 5% CMC | Held at room temperature 24 hours, then at 165° C. for 16 hours | $\rho$ = 0.613 g/cc NGWC = 116.0 V/V NG Act. = 11.8 g/kg | Good, the monolith can easily be handled |
| 90% SA1500 10% CMC | Held at 40° C. for 72 hours + 90% Relative Humidity (RH), then 3 hours at 120° C. and then 24 hours at 165° C. | $\rho$ = 0.471 g/cc NGWC = 124.1 V/V NG Act. = 13.8 g/kg | Poor, one of five parts resulted in an acceptably intact monolith |
| 92% SA1500 8% CMC | RT to 40° C. @ 0.1° C./min, hold for 4 hours, 40° C. to 60° C. @ 0.1° C./min hold for 2 hours, 0.1° C./min to 120° C. hold for 6 hours | N/A | None, all parts fell apart in the oven |
| 92% SA1500 8% Methocel | RT to 40° C. @ 0.1° C./min, hold for 4 hours, 40° C. to 60° C. @ 0.1° C./min hold for 2 hours, 0.1° C./min to 120° C. hold for 6 hours | N/A | None, all parts fell apart in the oven |
| 90% SA1500 10% Methocel | RT to 40° C. @ 0.1° C./min, hold for 4 hours, 40° C. to 60° C. @ 0.1° C./min hold for 2 hours, 0.1° C./min to 120° C. hold for 6 hours | N/A | None, all parts fell apart in the oven |
| 80% SA1500 20% CMC | Hold at 40° C. at ~70% RH then placed in oven and heated to 120° C., held at 18 hours. | N/A | None, all parts fell apart in the oven |
| 54% SA1500 36% Coconut 10% CMC | 48 hours in 40-50° C., 90% humidity, 120° C. 10 hours, 165° C. 14 hours | $\rho$ = 0.636 g/cc NGWC = 129.8 V/V NG Act. = 12.1 g/kg | Good, solid parts. |
| 67.5% SA1500 22% Coconut 10% CMC | 48 hours in 40-50° C., 90% humidity, 120° C. 10 hours, 165° C. 14 hours | $\rho$ = 0.615 g/cc NGWC = 128.2 V/V NG Act. = 12.2 g/kg | Good, solid parts. |
| 90% SA1500 | 24 hours humidity chamber | $\rho$ = 0.48 g/cc | Stayed together. |

TABLE 3-continued

Examination of monolith structural integrity

Figure 9A:
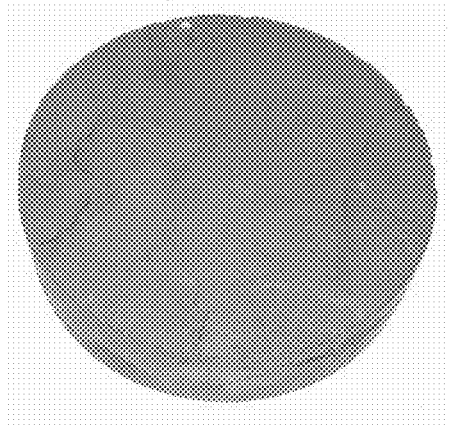
FIGS. 9A and 9B are pictures of activated carbon monoliths with examples using Nuchar® SA-1500, using coconut derived activated carbon, and binder.
Figure 9B:
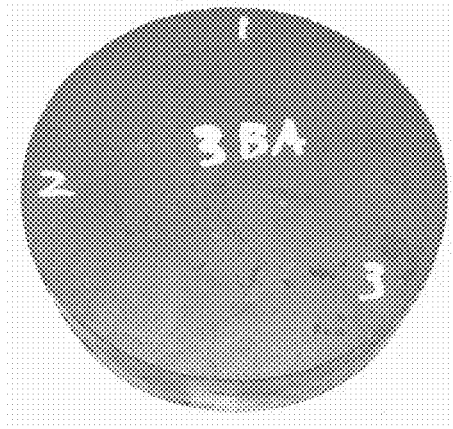
Figure 10A:
FIGS. 10A and 10B are pictures of activated carbon monoliths of the present disclosure.
Figure 10B:

| Formulation (wt. %) | Drying Condition | Performance: 1. Apparent density 2. Volume Capacity 3. Grav. Capacity | Structural Integrity |
|---|---|---|---|
| 9.5% CMC 0.5% PET 4DG Fiber | (40° C.): 120° C. 10 hours, 165° C. 14 hours. | NGWC = 121.2 V/V NG Act. = 13.9 g/kg | Somewhat fragile when handled. |
| 90% SA1500 9.9% CMC 0.1% PET 4DG Fiber | 24 hours humidity chamber (40° C.): 120° C. 10 hours, 165° C. 14 hours. | N/A | Very fragile, broke apart when handled |
| 54% SA1500 36% Coconut 10% CMC | 48 hours in 40-50° C. + 90% humidity, 120° C. 10 hours, 165° C. 14 hours | $\rho$ = 0.653 g/cc NGWC = 122.0 V/V NG Act. = 11.7 g/kg | Good, rigid part. See FIGS. 9A and 9B. |
| 42.75% SA1500 42.75% WVA1500 12.5% CMC 2% PET 4DG fiber | 24 hours at ambient T, 24 hours at 40-50° C. + 90% RH, 110° C. for 24 hours | $\rho$ = 0.554 g/cc MWC = 107.7 V/V Meth Act. = 10.1 g/kg | Good, rigid part. See FIGS. 10A and 10B. |

NGWC = natural gas working capacity, volume of natural gas ($cm^3$) divided by volume of container ($cm^3$) or,
MWC = methane working capacity, volume of methane gas ($cm^3$) divided by volume of container ($cm^3$).
NG Act. = the weight of natural gas (grams) divided by sample weight (100 grams) or,
Meth Act. = the weight of methane gas (grams) divided by sample weight (100 grams)
Note:
Methane values will be lower than NG because of molar mass differences (approximately 3-5%)

As can be seen from Table 3, numerous types of scaffolding material (e.g., PET fiber, PLA fiber, Nylon-6,6', and/or PET 4DG™ fiber) were effective in preparing monoliths of the present disclosure (i.e., monoliths with good, viable or acceptable structural integrity). In comparison, the monoliths formulations that lacked fibers and coconut did not produce monoliths with unacceptable structural integrity.

Example 6. Examination of Cyclability of Monoliths with Varying Formulations Parts were produced with varying formulations and the NG Act. and MWC or NGWC were examiner for each monolith formulation, as shown in Tables 4-7 below. The tables indicate the importance of adsorbent in the monolith form. Table 4 displays the use of a Nuchar® RGC SA1500 carbon which is similar to Nuchar® SA1500 with the exception of a post-production heat treatment at elevated temperatures. The additional heat treatment results in some pore collapse creating smaller size pores that are prone for irreversible storage. To enable the use of a higher activated carbon, Nuchar® SA-1500, coconut activated carbon was used as a process aid with results shown in Table 6. However, the coconut activated carbon has a detrimental effect over the life of the product. Furthermore, monoliths made solely from coconut activated carbon were observed to have a significant drop in performance over multiple cycles. The monoliths were rigid and structurally sound, however the performance prohibits their use in gas adsorption, e.g., the natural gas market. In comparison, Table 5 displays the performance of when Nuchar® SA1500 is used without the addition of coconut activated carbon or post-production heat treatments; the performance is more robust over multiple cycles. The use of a scaffold material enabled the monolith to be solely produced using Nuchar® SA-1500 activated carbon. Nuchar® SA-1500 displayed the most robust cycling performance while remaining structurally sound and intact post-drying.

TABLE 4

NG Act. and MWC/NGWC for an activated carbon monolith with 90 wt. % RGC SA1500 and 10 wt. % CMC binder over seven adsorption cycles and the calculated percent change from initial adsorption cycle. 90 wt. % RGC SA1500 and 10 wt. % CMC

| Sample | Cycles | NG Act. | | % Change in NG Act |
|---|---|---|---|---|
| | | | MWC (vessel) | |
| X142314 | 1 | 14.5 | 130 | |
| | 2 | 12.3 | 130 | −15 |
| | 3 | 12.1 | 130 | −17 |
| | 4 | 11.7 | 128.5 | −19 |
| | 5 | 11.5 | 128.8 | −21 |
| | 6 | 11.5 | 127.4 | −21 |
| | 7 | 11.1 | 127.9 | −23 |
| | | | NGWC (vessel) | |
| X142458 | 1 | 15.1 | 123.5 | |
| | 2 | 12.6 | 120.3 | −17 |
| | 3 | 12.2 | 122.9 | −19 |
| | 4 | 12.2 | 121.4 | −19 |
| | 5 | 11.9 | 122 | −21 |
| | 6 | 11.8 | 120.9 | −22 |
| | 7 | 11.9 | 122.3 | −21 |
| X142459 | 1 | 14.4 | 124.6 | |
| | 2 | 12.3 | 126.6 | −15 |
| | 3 | 11.9 | 123.5 | −17 |
| | 4 | 11.8 | 124 | −18 |
| | 5 | 11.4 | 123.7 | −21 |
| | 6 | 11.5 | 125.2 | −20 |
| | 7 | 11.4 | 124 | −21 |

TABLE 5

NG Act. and NGWC for an activated carbon monolith with 85.5 wt. % SAHIACT, 12.5 wt. % CMC binder, and 2 wt. % 4DG fibers (6 dpf × ¼") over eleven adsorption cycles and the calculated percent change from initial adsorption cycle.
85.5 wt. % SAHIACT, 12.5 wt. % CMC binder, and 2 wt. % 4DG fibers (6 dpf × ¼")

| Sample | Cycles | NG Act | NGWC (vessel) | % Change in NG Act |
|---|---|---|---|---|
| X151378 (60.73%, 0.542 g/cc, pressed 20 ton, 48 hours HC, dried 165° C.) | 1 | 13 | 127.7 | |
| | 2 | 11.7 | 128.5 | −10 |
| | 3 | 11.3 | 127.1 | −13 |
| | 4 | 11.1 | 124.4 | −15 |
| | 5 | 11.1 | 124.4 | −15 |
| | 6 | 11.1 | 124.1 | −15 |
| | 7 | 10.7 | 122.6 | −18 |
| | 8 | 10.7 | 123.5 | −18 |
| | 9 | 10.5 | 126.2 | −19 |
| | 10 | 10.6 | 125.6 | −18 |
| | 11 | 10.4 | 125.6 | −20 |
| X151438 (CHS muller, 62.1%, 0.544 g/cc, pressed to 20 ton, 48 hours HC, dried to 165° C.) | 1 | 13.4 | 125.3 | |
| | 2 | 11.8 | 125 | −12 |
| | 3 | 11.4 | 124.4 | −15 |
| | 4 | 11.1 | 124.4 | −17 |
| | 5 | 11.1 | 124.4 | −17 |
| | 6 | 11.1 | 124.1 | −17 |
| | 7 | 10.7 | 122.6 | −20 |
| | 8 | 10.7 | 123.5 | −20 |
| | 9 | 10.7 | 123.2 | −20 |
| | 10 | 10.6 | 123.2 | −21 |
| | 11 | 10.7 | 123.2 | −20 |

TABLE 6

NG Act. and NGWC for an activated carbon monolith with 54 wt. % SAHIACT, 31.5 wt. % CP-900, 12.5 wt. % CMC binder, and 2 wt. % 4DG fibers (6 dpf × ¼") over eleven adsorption cycles and the calculated percent change from initial adsorption cycle.
54 wt. % SAHIACT, 31.5 wt. % CP-900, 12.5 wt. % CMC binder, and 2 wt. % 4DG fibers (6 dpf × ¼")

| Sample | Cycles | NG Act | NGWC (vessel) | % Change in NG Act |
|---|---|---|---|---|
| X151507 (CHS muller, 54.95%, 0.64 g/cc, pressed to 20 ton, 24 hours HC, dried to 165° C.) | 1 | 11.8 | 123.7 | |
| | 2 | 10.1 | 123.2 | −14 |
| | 3 | 9.7 | 121.7 | −18 |
| | 4 | 9.4 | 120.9 | −20 |
| | 5 | 9.2 | 121.2 | −22 |
| | 6 | 9.1 | 120 | −23 |
| | 7 | 9 | 119.5 | −24 |
| | 8 | 8.8 | 118.9 | −25 |
| | 9 | 8.8 | 118.9 | −25 |
| | 10 | 8.8 | 118.9 | −25 |
| | 11 | 8.7 | 119.2 | −26 |

TABLE 7

NG Act. and NGWC for an activated carbon monolith with 88 wt. % PC coconut, 10 wt. % CMC 7HF binder, and 2 wt. % 4DG fibers (6 dpf × ¼") over eighteen adsorption cycles and the calculated percent change from initial adsorption cycle
88 wt. % PC coconut, 10 wt. % CMC 7HF binder, and 2 wt. % 4DG fibers (6 dpf × ¼")

| Sample | Cycles | NG Act | NGWC (vessel) | % Change in NG Act |
|---|---|---|---|---|
| X151635 (CHS muller 49.61% pressed 20 tons 24 HC dried 110° C. overnight) | 1 | 10.3 | 125.7 | |
| | 2 | 8.2 | 123.9 | −20 |
| | 3 | 8 | 120.6 | −22 |
| | 4 | 7.6 | 119.3 | −26 |
| | 5 | 7.5 | 118.1 | −27 |
| | 6 | 7.2 | 115.9 | −30 |
| | 7 | 7.2 | 115.1 | −30 |
| | 8 | 7 | 115.2 | −32 |
| | 9 | 7 | 114.8 | −32 |
| | 10 | 6.9 | 113.8 | −33 |
| | 11 | 6.8 | 113.6 | −34 |
| | 12 | 6.7 | 111.4 | −35 |
| | 13 | 6.6 | 111.9 | −36 |
| | 14 | 6.8 | 111.6 | −34 |
| | 15 | 6.2 | 108.6 | −40 |
| | 16 | 6.6 | 110.8 | −36 |
| | 17 | 6.2 | 107.9 | −40 |
| | 18 | 6.4 | 108.5 | −38 |

Specific Embodiments

A porous gas sorbent monolith, comprising: adsorbent; a binder; and a scaffold material.

In any aspect or embodiment disclosed herein, the scaffold material includes at least one of a natural fiber scaffold and a synthetic fiber scaffold.

In any aspect or embodiment disclosed herein, the natural fiber scaffold includes alpaca fibers.

In any aspect or embodiment disclosed herein, the synthetic fiber scaffold includes at least one of polypropylene fibers, polyester fibers, and 4DG fibers.

In any aspect or embodiment disclosed herein, the adsorbent includes pore volume (<25 Å) on a volume basis of about or greater than 0.3 cc/cc.

In any aspect or embodiment disclosed herein, the adsorbent carbon is present in an amount of at least 77 wt. %.

In any aspect or embodiment disclosed herein, the binder is present in an amount of no greater than 20 wt. %.

In any aspect or embodiment disclosed herein, the scaffold material is present in an amount of no greater than 3 wt. %.

In any aspect or embodiment disclosed herein, the article has a drying temperature in a range of about 110° C. to about 250° C.

In any aspect or embodiment disclosed herein, drying temperature is in a range of about 110° C. to about 230° C.

In any aspect or embodiment disclosed herein, the drying temperature is about 165° C.

In any aspect or embodiment disclosed herein, the scaffold material has a glass transition temperature ($T_g$) in a range of about 200° C. to about 270° C.

In any aspect or embodiment disclosed herein, the $T_g$ of the scaffold material is 250° C.

A method of making a porous gas sorbent monolith, the method comprising: admixing adsorbent, a binder, and a scaffold material; compressing the admix into a shaped structure; and applying heat to the compressed admix.

In any aspect or embodiment disclosed herein, the adsorbent is present in an amount of at least 77 wt. %; and/or the binder is present in an amount no greater than 20 wt. %; and/or the scaffold material is present in an amount no greater than 3 wt. %.

In any aspect or embodiment disclosed herein, the scaffold material includes at least one of a natural fiber scaffold and a synthetic fiber scaffold.

In any aspect or embodiment disclosed herein, the natural fiber scaffold includes alpaca fibers.

In any aspect or embodiment disclosed herein, the synthetic fiber scaffold includes at least one of polypropylene fibers, polyester fibers, and 4DG fibers.

In any aspect or embodiment disclosed herein, the compressing the admix includes applying at least 1,250 psi of pressure.

In any aspect or embodiment disclosed herein, the applied pressure is greater than 1,500 psi.

In any aspect or embodiment disclosed herein, the shape of the mold is at least one of a prism, a cylinder, an oval prism, a cube, an elliptical prism, a rectangular prism, a pentagonal prism.

A gaseous storage system comprising: a container; and a porous gas sorbent monolith comprising: adsorbent; a binder; and a scaffold material.

In any aspect or embodiment disclosed herein, the tank is configured to withstand at least 1,000 psi.

In any aspect or embodiment disclosed herein, the adsorbent is present in an amount of at least 77 wt. %; and/or the binder is present in an amount no greater than 20 wt. %; and/or the scaffold material is present in an amount no greater than 3 wt. %.

While preferred embodiments of the present disclosure have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention. Furthermore, the system may comprise at least one device for charging and/or discharging the system or a plurality of devices for charging and/or discharging the system.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the present disclosure described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the present disclosure described herein. Such equivalents are intended to be encompassed by the following claims.

What is claimed is:

1. A porous gas sorbent monolith, comprising an admixture of:
   activated carbon adsorbent in an amount of from about 85 wt % to about 95 wt %, and having for pores of less than 25 Å a pore volume of about 0.3 cc/g or greater;
   a polymer binder selected from the group consisting of a methylcellulose, an alginate, a fluoropolymer, and a combinations thereof, in an amount of from about 5 wt % to about 13 wt %; and
   a polymer fiber scaffold material selected from the group consisting of a polyester fiber, polylactic acid fiber, a nylon fiber and a combination thereof, in an amount of from about 1 wt % to about 2 wt %,
   wherein the porous gas sorbent monolith has a side of at least about 88.9 mm and a height of from about 19.05 mm to about 254 mm, and upon drying at a temperature of from 110° C. to about 180° C. the polymer binder and polymer fiber scaffold material retain their original structure, and wherein the porous gas sorbent monolith has a natural gas activity (NG Act) of from 11.3 to 15.1 g/100 g and a toughness of greater than 17 kN/m$^2$.

2. The monolith of claim 1, wherein the polymer fiber scaffold material includes a nylon fiber.

3. The monolith of claim 1, wherein the polymer fiber scaffold material includes a polyester fiber.

4. The monolith of claim 1, wherein the monolith drying temperature is from about 110° C. to about 150° C.

5. The monolith of claim 4, wherein the drying temperature is about 165° C.

6. The monolith of claim 1, wherein the polymer fiber scaffold material has a glass transition temperature ($T_g$) in a range of about 200° C. to about 270° C.

7. The monolith of claim 6, wherein the $T_g$ of the polymer fiber scaffold material is 250° C.

8. The monolith of claim 1, wherein the polymer binder is at least one of carboxymethylcellulose, hydroxypropylmethylcellulose, sodium alginate, polytetrafluoroethylene or a combination thereof.

9. A gaseous hydrocarbon storage system comprising:
   a container; and
   a porous gas sorbent monolith of claim 1.

10. The gaseous hydrocarbon storage system of claim 9, wherein the container is configured to withstand at least 1,000 psi.

* * * * *